(12) United States Patent
Weiss (10) Patent No.: US 10,499,658 B2
(45) Date of Patent: Dec. 10, 2019

(54) FOODSTUFF-CONVEYING AND -DISCHARGING APPARATUS

(71) Applicant: R. WEISS VERPACKUNGSTECHNIK GMBH & CO. KG, Crailsheim (DE)

(72) Inventor: Reinald Weiss, Schopfloch (DE)

(73) Assignee: R. WEISS VERPACKUNGSTECHNIK GMBH & CO. KG, Crailsheim (DE)

( * ) Notice: Subject to any disclaimer, the term of this patent is extended or adjusted under 35 U.S.C. 154(b) by 0 days.

(21) Appl. No.: 15/752,520

(22) PCT Filed: Aug. 10, 2016

(86) PCT No.: PCT/EP2016/069087
§ 371 (c)(1),
(2) Date: Feb. 13, 2018

(87) PCT Pub. No.: WO2017/025576
PCT Pub. Date: Feb. 16, 2017

(65) Prior Publication Data
US 2018/0235240 A1 Aug. 23, 2018

(30) Foreign Application Priority Data
Aug. 13, 2015 (DE) .................... 10 2015 113 400

(51) Int. Cl.
*A21B 3/07* (2006.01)
*A61B 7/00* (2006.01)
(Continued)

(52) U.S. Cl.
CPC .................. *A21B 3/07* (2013.01); *A21B 7/00* (2013.01); *B65G 47/57* (2013.01); *G07F 11/26* (2013.01)

(58) Field of Classification Search
CPC .. A21B 3/07; A21B 7/00; B65G 47/57; G07F 11/26
(Continued)

(56) References Cited

U.S. PATENT DOCUMENTS 4,687,119 A 8/1987 Juillet
4,722,430 A * 2/1988 Canziani ............. B65G 47/962
198/370.04

(Continued)

FOREIGN PATENT DOCUMENTS

CA 2763760 * 12/2010 ............... A21B 1/48
CH 585444 A5 2/1977
(Continued)

OTHER PUBLICATIONS

International Preliminary Report on Patentability dated Feb. 22, 2018 for PCT/EP2016/069087.
(Continued)

*Primary Examiner* — James R Bidwell
(74) *Attorney, Agent, or Firm* — Kevin E. West; Advent, LLP (57) ABSTRACT

Apparatuses and systems are described for conveying and delivering foodstuffs. A foodstuff conveying and delivery apparatus includes a housing in which foodstuffs are conveyed, in particular, to a discharging or output point in order to be removed by a person.

20 Claims, 3 Drawing Sheets

(51) Int. Cl.
*G07F 11/26* (2006.01)
*B65G 47/57* (2006.01)
*A21B 7/00* (2006.01)

(58) Field of Classification Search
USPC .................................. 198/347.1, 801, 802
See application file for complete search history.

(56) References Cited

U.S. PATENT DOCUMENTS

| | | | |
|---|---|---|---|
| 5,141,128 A * | 8/1992 | Pippin | B65G 17/16 |
| | | | 198/801 |
| 6,499,627 B2 * | 12/2002 | Arai | G07F 11/165 |
| | | | 221/130 |
| 6,755,322 B1 | 6/2004 | Herzog et al. | |
| 2004/0065523 A1 * | 4/2004 | Lichti | B65G 1/127 |
| | | | 198/347.3 |
| 2014/0346017 A1 | 11/2014 | Hecht | |

FOREIGN PATENT DOCUMENTS

| | | |
|---|---|---|
| DE | 3816028 C2 | 11/1989 |
| DE | 29520735 U1 | 3/1996 |
| DE | 102009026619 A1 | 12/2010 |
| EP | 0341564 A1 | 6/1989 |
| EP | 1688042 A2 | 8/2006 |
| FR | 2681217 A1 | 3/1993 |

OTHER PUBLICATIONS

Search Report dated May 3, 2016 for German Patent Appln. No. 102015113400.4.
International Search Report dated Oct. 19, 2016 for PCT/EP2016/069087.
URL:http://de.wikipedia.org/w/index.php?title=Schrittmotor&oldid=133174975, Absatz "Positionierung", Jun. 17, 2015, XP055307812.

* cited by examiner

FOODSTUFF-CONVEYING AND -DISCHARGING APPARATUS

BACKGROUND

Apparatuses serve to convey and ultimately to deliver foodstuffs, for example baked goods in supermarkets. An upstream oven can be used to bake or bake through baked goods on site and to store the latter in an output store, which is accommodated in a housing. Upon a customer's request, the baked good is then conveyed from the output store by means of a transport device—or even directly from the transport device itself, on which foodstuffs may possibly be temporarily stored—to a discharging point, which can also serve at the same time as an output compartment and from which the customer removes the baked good.

Dispensing machines can have an elevator that is able to move in a vertical shaft. The elevator transports the foodstuffs from a higher level to a lower level at which the output compartment is also arranged.

BRIEF DESCRIPTION OF THE DRAWINGS

The Detailed Description is explained in more detail in the following text with reference to figures, in which.

DETAILED DESCRIPTION

The aim of the present disclosure is to provide an apparatus of the type mentioned at the beginning, which takes up only little space but is able to convey foodstuffs, in particular baked goods, quickly, gently and reliably within the apparatus.

The present disclosure is distinguished by the fact that the foodstuff conveying and delivery apparatus according to the present disclosure, also referred to just as apparatus for short in the following text, includes a transport device with at least one platform that is pivotable about a horizontal axis, wherein the pivotable platform is pivotable by means of a stepper motor. This platform serves as an elevator for foodstuffs, wherein, as a result of its pivotability, the loading and unloading of the platform and the gentle and safe transport of the foodstuffs in the apparatus are ensured in an optimal manner and cost-effectively. Furthermore, the transport route is short as a result of the vertical movement of the platform and can be covered quickly.

In this case, the stepper motor is operatively connected to the platform, or is coupled to the platform, such that the latter can be pivoted by means of the stepper motor. This operative connection accordingly allows active pivoting of the platform, wherein a control device preferably actuates the stepper motor appropriately.

A plurality of feeding devices can be arranged one above another in the housing. The at least one platform is in this case movable in the shaft such that at least some of these feeding devices can charge the platform with foodstuffs by the platform being positioned appropriately with regard to these feeding devices.

In some embodiments, the pivot axle of the platform is perpendicular to the conveying direction in which the feeding device conveys the foodstuffs to the platform. In this case, the loading (charging) and unloading (discharging) of the platform can be carried out particularly easily. It is also possible for the platform to have substantially the same overall depth as the feeding device.

A particularly precise pivoted position of the platform is realizable in particular when a stepper motor is coupled to the pivot axle of the platform. In this case, the pivoting motor travels upward and downward in the shaft together with the platform. Since such stepper motors are very robust and also available in very small sizes, no space problems arise with this configuration. In addition, the pivot angle of the platform and the fixing thereof in a pivoted position can be realized very precisely by means of the stepper motor.

According to one alternative, the stepper motor acts on a different point of the platform in order to pivot the platform about the pivot axle.

According to one embodiment, the pivot axle is arranged on the platform side facing away from the feeding device. In other words, the free, non-articulated edge of the platform is oriented toward the feeding device.

According to an alternative embodiment, the pivot axle is arranged on the platform side facing the feeding device or between the front and rear edges of the platform with regard to the feeding device, for example in the middle. As a result of such a construction, the platform can, if appropriate, take the weight of the foodstuff to be received better.

In a configuration, it is possible for example for the ends of the pivot axle to run in two perpendicular guide slots located opposite one another in the shaft and to engage with a stepper motor for pivoting the platform in the region of the platform edge facing away from (or facing) the feeding device. The pivot axle can in this case be arranged in different locations with regard to the feeding device (close to or remote from the feeding device or in an intermediate position), depending on the arrangement of the guide slots and of the stepper motor.

Such perpendicularly extending guide slots provide for reliable guidance of the platform. Alternatively, the stepper motor can also engage directly with the pivot axle of the platform.

In some embodiments, the pivotable platform is configured to be pivotable upward and downward with regard to a horizontal plane or horizontal line. Thus, it can approach for example with a pivot axle placed lower down with respect to the foodstuff supporting plane of the feeding device and the platform can be placed in an upwardly pivoted state (with regard to the pivot axle) with its front edge at the same height as or a slightly lower height than the transport plane (i.e. the supporting surface for the foodstuffs) of the feeding device. In this state, the feeding device can convey a foodstuff to the platform, said foodstuff then sliding downward onto the platform and being stored there safely for vertical transport.

As a result of the platform being pivoted downward, it is easily and reliably possible for the foodstuff to be transported away from the platform, in particular into an output compartment, by the foodstuff sliding downward from the platform under the force of gravity. If the transporting away is also supported by an actively driven transport means, for example a conveyor band in the immediate vicinity of the downwardly pivoted front edge of the platform, said transport means can take hold of the foodstuff at its front side and support the transporting away from the platform.

In embodiments, the pivotable platform can be positionable in a pivoted position with respect to a horizontal plane during the passage from the feeding device to the discharging point, in order that the foodstuff transported on the platform can be stored safely during the passage.

The pivotable platform particularly can have an upwardly projecting retention device on the side facing away or intended to be turned away (when settable) from the feeding device. When a foodstuff is conveyed onto the platform pivoted into an inclined position, the foodstuff cannot slide toward the rear into the shaft on account of the retention device. The retention device is configured for example as a wall or grating, including the configuration as a fixed housing wall. According to one embodiment, the retention device is configured to be able to travel with the platform but not to be pivotable therewith; instead, it remains in its upright position even when the platform is pivoted. In other embodiments, the retention device is connected to the platform such that it not only travels along therewith but is also pivoted therewith.

Furthermore, a stepper motor can be provided, which is capable of moving the pivotable platform in a vertical direction in the shaft. In this case, rapid, reliable, positionally accurate movement of the platform is realizable. The stepper motor can be installed in a fixed manner and drives a preferably circulating element to which the platform is attached in an articulated manner.

In a corresponding configuration, the transport device has a circulating element, for example a conveyor band, conveyor belt, conveyor cable and/or conveyor chain—in general: conveyor line. The at least one platform is attached in an articulated manner to the circulating element and a stepper motor is also arranged thereon, said stepper motor being capable of pivoting the platform. Therefore, in a very cost-effective configuration, only one stepper motor for the vertical movability of the platform and one stepper motor for pivoting this platform are provided.

In some embodiments, the platform is configured and arranged such that it is loadable from two sides. For the one part, this is the side of said feeding device, for the other part the side on the opposite side from this feeding device. In this case, the shaft is not closed on this second side, but rather a second feeding device—which is likewise a part of the apparatus according to the invention—can be provided for example in a manner immediately adjoining the platform, in order to charge the platform with at least one foodstuff. In this case, the platform is configured to be pivotable toward these two sides, i.e. to be tiltable or pivotable in one direction and in the other. It is also possible for said platform—in addition to being charged from one side via said first feeding device—to be chargeable from an adjacent, second platform which is likewise movable in the same or an adjacent shaft and is arranged on that side of the first platform that faces away from the first feeding device. This second platform can for its part be charged by a second feeding device from the side facing away from said first platform.

In some embodiments, both the top side and the underside of the at least one platform are chargeable with at least one foodstuff. To this end, the platform is configured to be pivotable such that it crosses a vertical plane. In this case a retention device in the form of a wall extending preferably perpendicularly to the platform is provided on the front or rear edge of the platform (with regard to the feeding and discharging direction of the foodstuffs), said wall projecting beyond the platform on both sides. By means of this configuration, foodstuffs can be received and delivered by the platform from two different sides, without the foodstuffs being able to slide to the rear from the platform in one or the other position, but always being prevented therefrom by the retention device. Therefore, in particular the loading of the top side of the platform from a first supply device and the loading of the underside of the platform from an opposite second supply device, which is provided on the other side of the platform, is possible.

In one configuration, the at least one platform is mounted in an articulated manner by means of two parallel and spaced-apart axles, wherein one of these axles is said pivot axle. As a result of a relative movement of the two axles with respect to one another in a vertical direction, the platform can be pivoted. As a result of this configuration, on account of the dual mounting of the platform, in particular relatively heavy foodstuffs can be conveyed stably in a manner protected against tilting.

In some embodiments, it is possible to see into the shaft at least partially from outside the apparatus through at least one transparent pane. In this way, the foodstuff flow is also clearly visible to the consumer.

The present disclosure likewise relates to a unit having an oven and an apparatus, as described above, connected downstream of the oven.

According to an embodiment, this apparatus for conveying and delivering foodstuffs of such a unit can include at least one further feeding device (denoted second feeding device above), wherein the at least one platform is arranged between the two feeding devices and can be loaded from its two sides by means of the two feeding devices.

Figure 1:
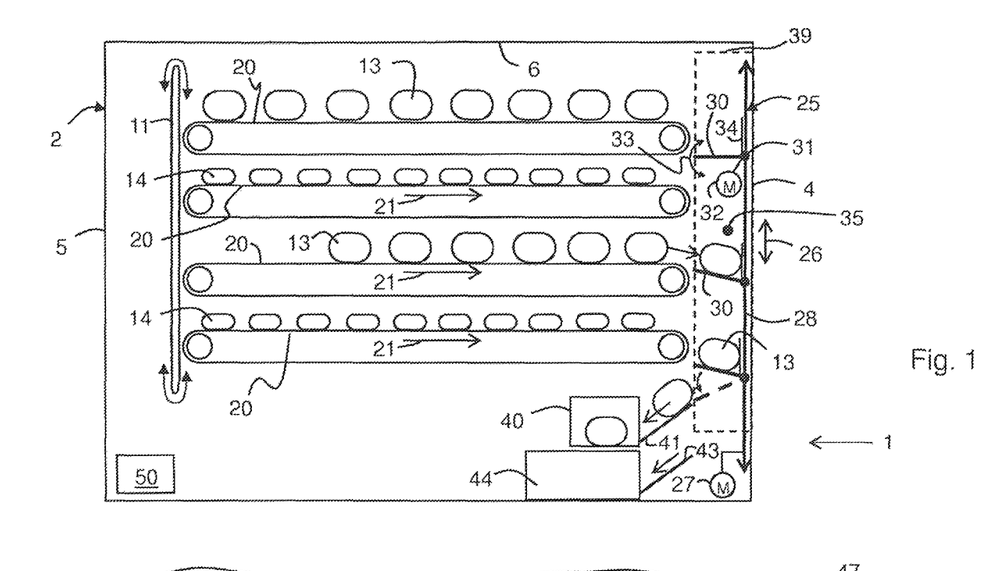
FIG. 1 shows a front view of a schematically illustrated apparatus according to the embodiments of the present disclosure, having a platform that is pivotable and movable in a shaft (front wall removed)
Figure 2:
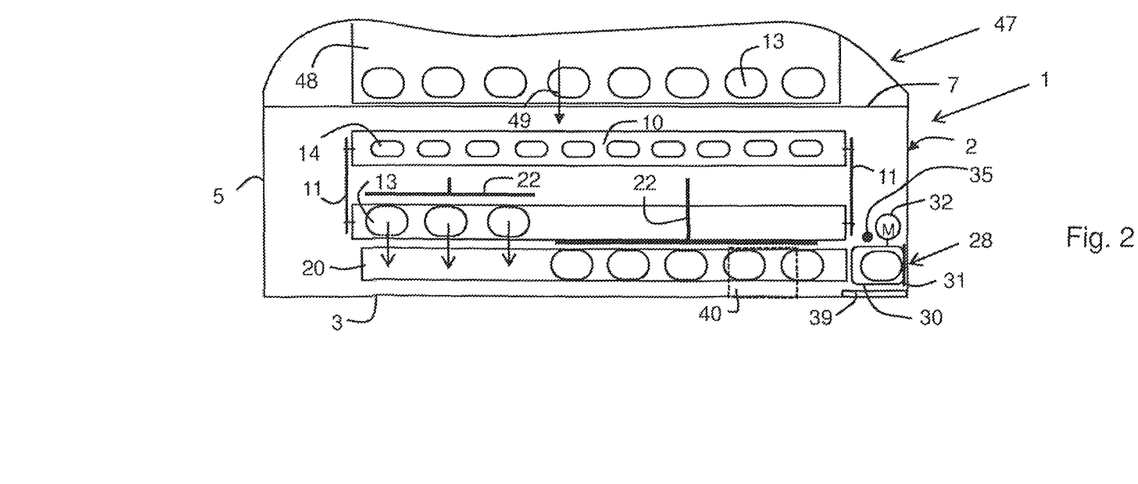
FIG. 2 shows a plan view of the apparatus in FIG. 1 with the cover removed.

FIGS. 1 and 2 illustrate a first embodiment of an apparatus 1 according to the present disclosure, which is configured to convey and deliver baked goods 13, 14, which are additionally stored in the apparatus 1. Connected upstream of the apparatus 1 is a continuous oven 47 (only indicated in part in FIG. 2). The present disclosure relates both to the apparatus 1 for conveying and delivering baked goods and to a unit which includes the continuous oven 47 and said apparatus 1.

The apparatus 1 serves as a supply store from which the desired type of foodstuff—in particular baked goods of different types, which have previously been baked or baked through in the oven 47—is able to be delivered in the desired number upon customer request.

The apparatus has a housing 2 made up of opaque walls. In this case, the housing 2 has a front wall 3 (removed in FIG. 1), a right-hand side wall 4 (as seen from the front wall 3), a left-hand side wall 5, a rear wall 6 and a cover 7.

Within the housing 2, there run a plurality of carriers 10, which are each coupled at their end sides to endless chains 11 or other endless conveyors which circulate in a vertical direction and the direction of circulation of which can preferably be reversed (for the sake of greater clarity, only one endless chain 11 is shown in FIG. 1, but, by contrast, both are shown in FIG. 2).

On the carriers 10 it is possible for different baked goods to be placed, which are automatically supplied from the continuous oven 47, connected upstream, in the conveying direction 49 via a conveyor band 48, wherein for example pushers (not illustrated) realize the transfer from the conveyor band 48 onto the carriers 10.

According to FIG. 2, ten bread rolls 14 are present next to one another on the uppermost carrier 10—preferably a multiplicity of circulating carriers 10 are provided—facing the continuous oven 47, while three loaves of bread 13 are present next to one another on the uppermost carrier 10 facing the front wall 3, while further five loaves of bread 13 have already been pushed onto a feeding device 20 from this carrier 10 in the direction of the front wall 3 (for more details, see below).

It is clear from FIGS. 1 and 2 that four feeding devices 20 in the form of horizontally and endlessly running conveyor bands are arranged immediately behind and along the front wall 3. When a carrier 10 is stopped by the lateral endless chains 11 at the level of such a feeding device 20 with the aid of a controller 50, it is possible—according to the present embodiment—to use two horizontal pushers 22 arranged alongside one another to push the baked goods 13 or 14 onto the feeding device 20 positioned at the same height.

The feeding device 20 is capable of transporting the baked goods 13 or 14 laterally in the conveying direction 21, in the present case toward the side wall 4 of the housing 2, perpendicularly to the pushing direction in which the pushers 22 transport the baked goods 13, 14 onto the feeding device 20.

According to the exemplary embodiment illustrated, all four feeding devices 20 are charged with baked goods 13 or 14, which are stored on carriers 10 (or other storage and transport devices), in each case with the aid of pushers 22.

In the housing 2, a transport device 25 is movable vertically in a shaft 35, which in the present case is arranged along the right-hand side wall 4 of the housing 2. The transport device 25 and the upward and downward direction of movement thereof is illustrated schematically as a long double arrow. It can be realized by means of conveyor bands, conveyor cables, conveyor belts etc. (in general: conveyor lines). The conveyor lines can be configured in a circulating manner. As can be gathered in particular from the plan view in FIG. 2, a platform 30 has, in the present case, dimensions which make it possible for in each case one loaf of bread 13 or a bread roll 14 to be able to be received fully thereon. In some embodiments, the platform 30 is configured in a rectangular manner in plan view and manufactured for example from thin stainless steel or aluminum.

The transport device 25 includes at least one such platform 30, which is pivotable about a horizontal pivot axle 31; see the double arrow 33 indicating the pivoting direction. To this end, use is made of a stepper motor 32 which can be coupled in particular to the pivot axle 31 (only indicated schematically). However, the stepper motor 32 can also act on some other point of the platform 30 in order to pivot the latter about the pivot axle 31. In the present case, the pivot axle 31 extends horizontally and perpendicularly to the conveying direction 21 of the feeding device 20 (and parallel to the pushing direction of the pushers 22). Furthermore, in FIGS. 1 and 2, the pivot axle 31 is arranged on that side of the platform 30 that faces away from the feeding device 20.

The stepper motor 32 makes it possible to pivot the platform 30 into the desired position and to leave it in this position in order for the baked goods 13, 14 to be transported onto the platform 30, to be transported onward by the platform 30 and to be transported off the platform 30 reliably. In particular, it is possible for the platform 30 to be pivoted—with regard to a horizontal plane which extends through the pivot axle 31—upward (see the platform 30 positioned centrally and the one positioned at the bottom and illustrated as a solid line in FIG. 1) and downward (see the bottom platform 30 illustrated by a dashed line in FIG. 1).

A plurality of platforms 30 are always indicated in FIGS. 1 and 3-5, in order to indicate the different possible positions thereof. It is also possible for a plurality of platforms 30 to actually be present, wherein, in that case, a stepper motor 32 can be assigned to each platform 30. In order to realize the invention, however, a single platform 30 is in principle sufficient and also most cost-effective. As mentioned, a plurality of endlessly circulating platforms 30 or platforms 30 that are arranged one above another are also possible and also encompassed by the present disclosure, however. The nonpivoted neutral position of the platform 30 is symbolized by the uppermost platform 30 in FIG. 1.

Provided on that side of the platform 30 that faces away from the feeding device 20 is a retention device 34 in the form of a perpendicularly projecting support, which, according to the present embodiment, is not pivoted along when the platform 30 is pivoted.

The platform 30 and the associated stepper motor 32 thereof are configured to be movable in a perpendicular direction (see double arrow 26) within the shaft 35, wherein, for this purpose, a stepper motor 27 that is arranged in a stationary manner is provided, said stepper motor acting for example on an endless conveyor line 28, for example configured as an endless conveyor band, on which the platform 30 or platforms 30 and each particular associated stepper motor 32 are directly or indirectly fastened. It should be noted that, for the sake of clarity, the associated stepper motor 32 is not illustrated at each platform 30 illustrated in the figures.

The platform 30 can accordingly move precisely in a vertical direction and be positioned with regard to the feeding device or feeding devices 20, including pivoting into a position suitable for receiving a baked good 13, 14.

The endless chains 11, the pushers 22, the supplying devices 20 and the movement and pivoting of the platform(s) 30 and other transport operations in the housing 2 are controlled by a control device 50 (only schematically indicated in FIG. 1). This is responsible for all of the control tasks and also processes, inter alia, request commands from customers who can select the type and number of baked goods 13, 14 stored and to be delivered by the apparatus 1 via input means (touchpad, selector switch, etc.—not illustrated here) on the front side of the housing 2.

Provided at the bottom end of the shaft 35 is a discharging point 40 which is configured as an output compartment in the present case. At the discharging point 40, there ends a chute 41 which is chargeable with a baked good 13 or 14 by the platform 30—when the latter has been moved into the corresponding position and pivoted downward.

Likewise, provided beneath the chute 41 is a further chute 43 which leads to a collecting container 44. Baked goods 13, 14 which have not sold out can be discharged into said collecting container 44—for example at the end of the day. In this case, the control device 50 for example gives the command to gradually convey the carriers 10 on which baked goods 13, 14 are still stored into the collecting container 44 via the platform 30, starting at a particular time.

It should be mentioned that configurations which employ the exploitation of the force of gravity in said sliding transfer onto the platform 30 and also the delivery—in this case onto the chutes 41, 43—are structurally simple and robust.

Upon a customer request via said input means, the feeding device 20 is actuated by the control device 50, according to FIG. 1, such that the loaves of bread 13 located on the feeding device 20 are conveyed in the direction of the transport device 25. One or the (when only one is present) platform 30 is positioned or brought into a position so as to adjoin the feeding device 20, and pivoted upward—with respect to the pivot axle 31—such that its free edge is approximately at the same height as or slightly lower than the transport plane of the feeding device 20. The feeding device 20 can thus convey, via its outermost edge, the loaf of bread 13 located farthest to the side onto the platform 30, where it slides downward until it rests against the retention device 34. Subsequently, the platform 30 is moved in the upwardly pivoted position to the chute 41 by means of the conveyor line 28 and then pivoted downward (see platform 30 illustrated by a dashed line), such that the loaf of bread 13 passes via the chute 41 to the discharging point or output compartment 40 and can be removed there by the customer.

FIG. 1 also indicates that a transparent pane 39 made for example of Plexiglas is provided on the front wall 3 along the shaft 35, such that the movements of the platform(s) 30 can be viewed by a customer through this pane 39. Customer interest can be increased thereby.

It should be noted that it is also possible for baguettes to be stored in the apparatus 1 and delivered. For this purpose, a separate flap (not illustrated) can be provided, which is located on the front side of the housing 2. The baguettes are accordingly not transported away to the side by means of the feeding device 20 but dropped perpendicularly downward into a separate output or the discharging point 40 (optionally supported by a chute). The corresponding configurations are not a part of the present disclosure, however.

Figure 3:
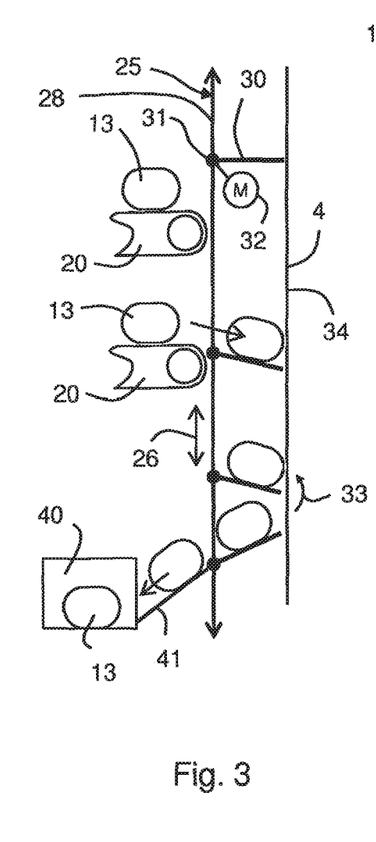
FIG. 3 shows a detail of a second embodiment of a pivotable platform in a front view.

FIG. 3 illustrates a detail of a second embodiment of a pivotable platform 30 in a front view. In this case, the pivot axle 31 is located immediately next to the feeding device 20, such that the free edge of the platform 30 faces away from the feeding device 20. Upon transfer of a loaf of bread 13 or of a bread roll 14 (or a soft pretzel or croissant, etc.) from the feeding device 20 onto the platform 30, the latter is pivoted downward in the present case, such that, in accordance with the embodiment illustrated, the corresponding baked good (loaf of bread 13 in FIG. 1) comes to rest against the side wall 4 of the housing 2 and is retained thereby.

Here, care should be taken, in terms of design, to ensure that the conveyor line 28 does not collide with the transport path of the baked goods 13, 14 from the feeding device 20 onto the platform 30. The conveyor line 28 can, to this end, extend for example at the sides of the platform 30 (these sides extend parallel to the conveying direction 21), wherein an attachment piece (not illustrated) carries the stepper motor 32 for pivoting the platform 30 and is moved up and down in the shaft 35. For its part, the platform 30 is coupled to the attachment piece such that the transport path for the baked goods 13, 14 from the feeding device 20 onto the platform 30 and the path for transporting them away from the platform 30 onto the chute 41 are free. Such a configuration is, of course, also possible for the embodiments illustrated in the other figures.

During the downward passage of the platform 30 in the shaft 35, the platform 30 remains in this pivoted position; alternatively, the platform 30 can be pivoted into a less downwardly inclined position, in order that the baked good (loaf of bread 13 in FIG. 3) does not rub excessively against the side wall 4, resulting in imperfections or damage to the baked good 13, 14. Upon reaching the chute 41, the platform 30 is pivoted upward such that the loaf of bread 13 passes via the chute 41 into the discharging point 40 configured as an output compartment.

In a slightly modified embodiment that is not illustrated, a rear wall firmly connected to the platform 30 is provided at the free end of the platform 30, the baked goods 13, 14 pushed onto the platform 30 coming to rest against said rear wall. To this end, the shaft 35 has to be configured in a correspondingly wide manner.

Figure 4:
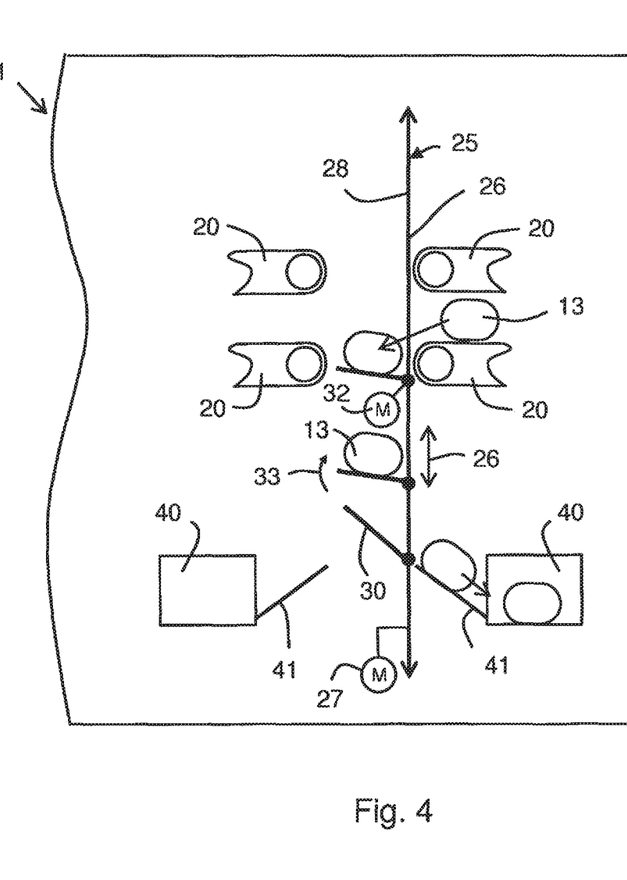
FIG. 4 shows a detail of a third embodiment with a platform that is chargeable from two sides, in a front view.

FIG. 4 illustrates a variant in which the platform 30 is loadable from two sides. To this end, respective feeding devices 20 convey baked goods (in this case loaves of bread 13) to the transport device 25 from each of the two sides, wherein, in the present case, the pivot axle 31 of one feeding device 20 (the right-hand one in FIG. 4) and the free edge of the platform 30 of the other feeding device 20 (the left-hand one in FIG. 4) face one another. In the present case, there are also two discharging points 40, which are each loadable via a chute 41. Alternatively, the baked goods are conveyed only to one discharging point 40. In the variant illustrated, as a result of the free end (with regard to the pivot axle 31) of the platform 30 being pivoted up, the baked goods 13, 14 are conveyed to the right-hand discharging point 40, and as a result of it being lowered, they are conveyed to the left-hand discharging point 40.

Figure 5:
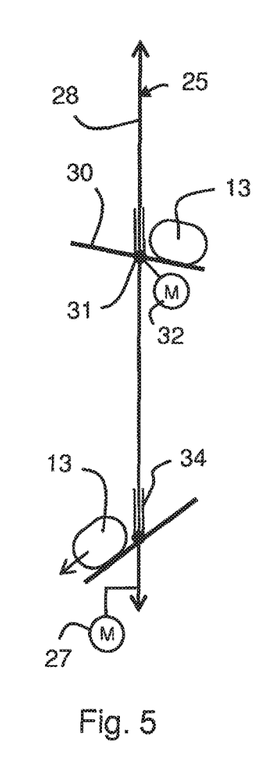
FIG. 5 shows a detail of a fourth embodiment of a pivotable platform in a front view.

FIG. 5 illustrates a detail of a fourth embodiment, in which the pivot axle 31 is arranged centrally on the platform 30. Charging from both sides (see FIG. 4) is possible here, too. Also illustrated is the fact that baked goods (in this case loaves of bread 13) can slide from one side of the platform 30 to the other side by pivoting. In this exemplary embodiment, the platform 30 is similar to a centrally mounted rocker. Furthermore, retention devices 34 are indicated, which are intended to prevent baked goods sliding through from one platform half to the other.

Figure 6:
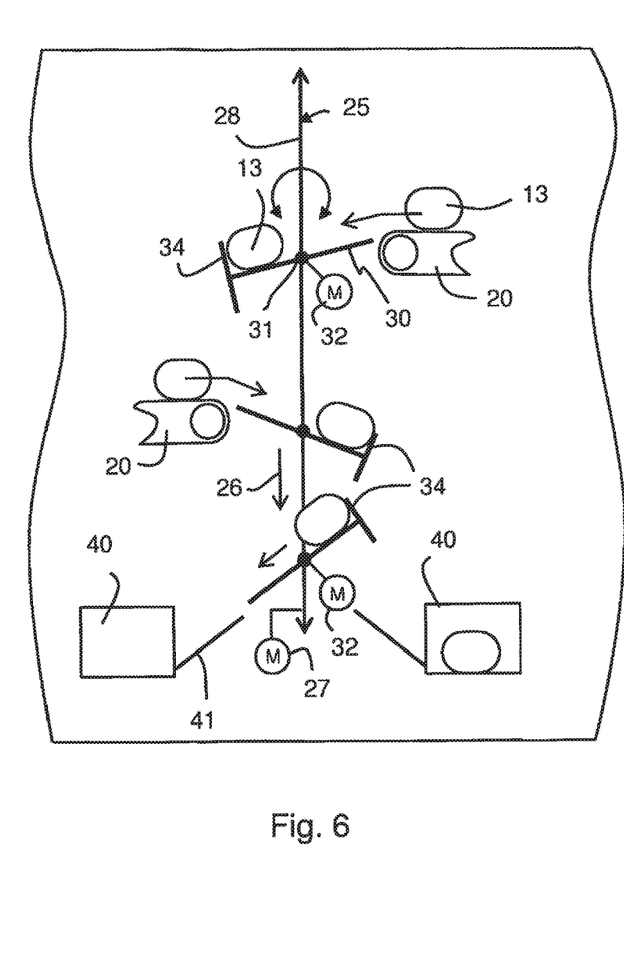
FIG. 6 shows a detail of a fifth embodiment with a platform that is chargeable from two sides, in a front view.

FIG. 6 illustrates a detail of a fifth exemplary embodiment. Here, both the top side and the underside of the platform 30 are chargeable with at least one baked good 13, 14. To that end, the platform 30 is configured to be pivotable about its pivot axle 31 with the aid of the stepper motor 32 such that it is able to cross a vertical plane (see part-circular double arrow). Provided on the front or rear edge of the platform 30 is a retention device 34 in the form of a wall extending perpendicularly to the platform 30, said wall projecting upwardly and downwardly beyond the platform 30. By means of this configuration, baked goods 13, 14 can be received and delivered by the platform 30 on two different sides without the baked good 13 or 14 being able to slide toward the rear from the platform 30 in one or the other position, but always being prevented therefrom by the retention device 34. Thus, the platform 30 can be loaded both from its top side and from its underside. To this end, that edge of the platform 30 that faces away from the retention device 34 faces the corresponding supply device 20 and the entire platform 30 is moved into the appropriate height and inclination. By being conveyed onto the inclined platform 30, the baked good 13 slides on the platform 30 as far as the retention device 34 (see the platform 30 illustrated centrally in FIG. 6). Subsequently, the platform 30 is moved downward (see direction of travel 26) and, as a result of the platform 30 pivoting, crossing a horizontal plane, the baked good 13 is transported to the discharging point 40. If a baked good 13 or 14 is intended to be received by the platform 30 from the other feeding device 20 (the one on the right in FIG. 6), said platform is pivoted about the pivot axle 31 by crossing a vertical plane, such that the other side of the platform 30 points upward (see uppermost platform 30 in FIG. 6).

Figure 7:
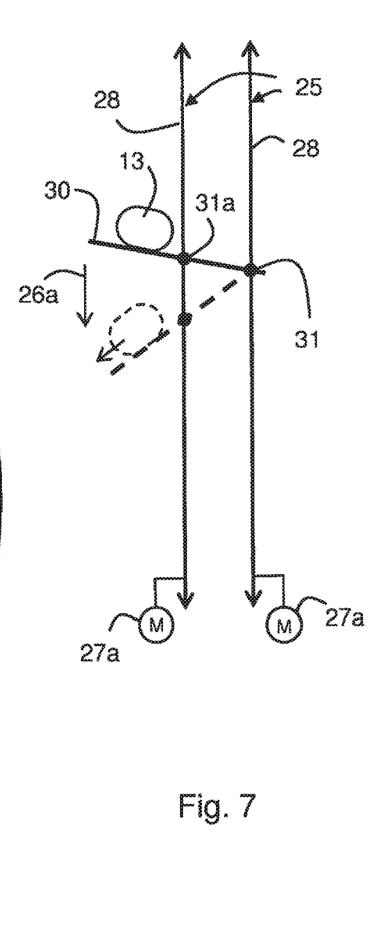
FIG. 7 shows a detail of a sixth embodiment of a pivotable platform in a front view.
Figure 8:
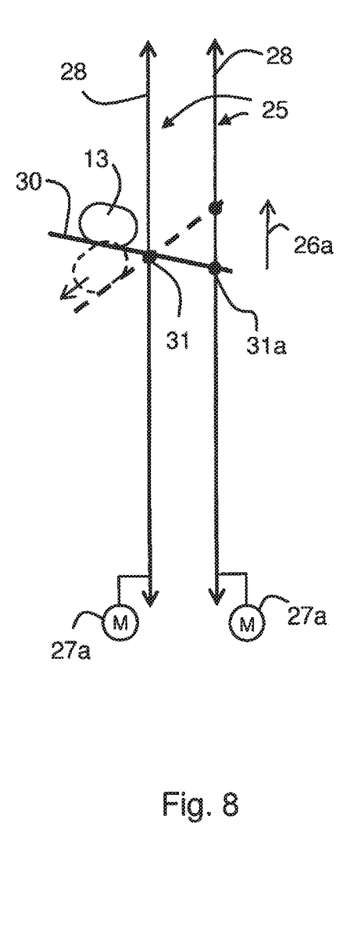
FIG. 8 shows a detail of a seventh embodiment of a pivotable platform in a front view.

In the two exemplary embodiments in FIGS. 7 and 8, two variants are illustrated in which the platform 30 has been mounted by means of two parallel and spaced-apart axles 31, 31a, wherein one of these axles corresponds to the pivot axle 31 described for the other embodiments. As a result of a relative movement of the two axles 31, 31a with respect to one another in a vertical direction (indicated by the two arrows 26a), the platform 30 can be pivoted. As a result of the dual mounting of the platform 30, in particular relatively heave foodstuffs can be conveyed stably in a manner prevented from tilting. Once the platform 30 has been inclined into its desired position and a baked good 13 has been received thereon, the platform 30 is moved downward, maintaining its inclined position, by a then uniform downward movement of both conveyor lines 28, imparted by two stepper motors 27a. In order to tip the baked good 13, one of the two conveyor lines 28 is in turn moved relative to the other conveyor line 28 by means of the associated stepper motor 27a.

The present disclosure has been explained in more detail on the basis of a number of exemplary embodiments, without these being intended to be interpreted in a limiting manner. Modifications within the claims are readily possible. Thus, it is possible, for example, for only one feeding device 20 to be arranged in a housing 2, said feeding device 20 charging one or more platforms 30 that are movable in the shaft 35 with one or more baked goods 13, 14. Of course, it is also readily possible for more than two different baked goods 13, 14 to be conveyed and delivered in an apparatus according to the invention.

LIST OF REFERENCE SIGNS

1 Apparatus
2 Housing
3 Front wall
4 Side wall
5 Side wall
6 Rear wall
7 Cover
10 Carrier
11 Endless chain
13 Loaf of bread
14 Bread roll
20 Feeding device
21 Conveying direction
22 Pusher
25 Transport device
26 Direction of travel
27, 27a Stepper motor
28 Conveyor line
30 Pivotable platform
31 Horizontal pivot axle
31a Horizontal pivot axle
32 Stepper motor
33 Pivoting direction
34 Retention device
35 Shaft
39 Pane
40 Discharging point
41 Chute
43 Chute
44 Collecting container
47 Oven
48 Conveyor band
49 Conveying direction
50 Control device

What is claimed is:

1. A foodstuff conveying and delivery apparatus, comprising:
   a housing;
   at least one feeding device in the housing, each feeding device comprising a horizontal conveyer configured for laterally conveying at least one foodstuff thereon;
   a vertically extending shaft in the housing;
   a motor-driven transport device located within the vertical shaft, the motor-driven transport device configured to travel up and down in the shaft and configured to be charged with the at least one foodstuff by the at least one feeding device; and
   a discharging point in or on the housing, the motor-driven transport device conveying the at least one foodstuff in the direction of the discharging point, the motor-driven transport device having at least one platform which travels in a vertical direction in the shaft, each platform being pivotable about a horizontal pivot axle and configured to be charged with the at least one foodstuff, the horizontal conveyor configured to convey a given foodstuff therefrom and onto a corresponding platform, wherein the at least one platform is pivotable via a stepper motor.

2. The apparatus as recited in claim 1, wherein the at least one feeding device comprises a plurality of feeding devices that are arranged one above another in the housing, at least some of the plurality of feeding devices being configured to charge the at least one platform.

3. The apparatus as recited in claim 1, wherein the pivot axle of the at least one platform is oriented perpendicularly to a conveying direction of the at least one feeding device toward the at least one platform.

4. The apparatus as recited in claim 1, wherein the stepper motor is at least one of coupled to the pivot axle or acts on a different point of the at least one platform, in order to pivot the platform about the pivot axle.

5. The apparatus as recited in claim 1, wherein the pivot axle of the at least one platform is arranged on at least one of a side of the at least one platform that faces away from the at least one feeding device, a side of the at least one platform that faces toward the at least one feeding device, or between the front and rear edges with regard to the at least one feeding device.

6. The apparatus as recited in claim 1, wherein a pivot angle of the at least one platform is settable via the stepper motor.

7. The apparatus as recited in claim 1, wherein when the at least one foodstuff is transferred, the at least one platform is positioned in a manner inclined upward toward the at least one feeding device in order that the at least one foodstuff can slide from the motor-driven transport device onto the at least one platform.

8. The apparatus as recited in claim 1, wherein when the at least one foodstuff is transferred, the at least one platform is positioned in a manner inclined downward toward the discharging point in order that the at least one foodstuff can slide from the at least one platform to the discharging point.

9. The apparatus as recited in claim 1, wherein during the passage from the at least one feeding device to the discharging point, the at least one platform is positionable in a pivoted position with respect to a horizontal plane in order to fix the position of the at least one foodstuff located on the at least one platform.

10. The apparatus as recited in claim 1, wherein an upwardly projecting retention device is assigned to the at least one platform on the side that faces away from or is able to be turned away from the at least one feeding device, the upwardly projecting retention device being configured as at least one of a wall or a grate.

11. The apparatus as recited in claim 1, wherein the at least one platform is movable in the shaft via a stepper motor.

12. The apparatus as recited in claim 1, wherein the motor-driven transport device comprises at least one circulating element to which the at least one platform is attached in an articulated manner.

13. The apparatus as recited in claim 1, wherein the at least one platform is pivotably arranged such that it is loadable both from a side of the at least one feeding device and from an opposite side via a second feeding device of the apparatus.

14. The apparatus as recited in claim 1, wherein the at least one platform is configured in such a way that the top side and the underside thereof are pivotable so as to selectively point upward to receive and deliver the at least one foodstuff on two different sides.

15. The apparatus as recited in claim 1, wherein the at least one platform is mounted in an articulated manner by two parallel and spaced-apart axles, of which one of the two parallel and spaced-apart axles is the pivot axle, and wherein the at least one platform is pivotable by relative movement of the two parallel and spaced-apart axles in a vertical direction.

16. The apparatus as recited in claim 1, further comprising at least one transparent pane for providing visibility into the shaft.

17. The apparatus as recited in claim 1, wherein the horizontal conveyor is comprised of an endless conveyor band.

18. The apparatus as recited in claim 12, wherein the least one circulating element comprises at least one of a conveyor band, a conveyor belt, a conveyor cable, or a conveyor chain.

19. A system for conveying and delivering a foodstuff to an oven, the system comprising:

a foodstuff conveying and delivery apparatus, the food stuff conveying and delivery apparatus comprising:
a housing;
at least one feeding device disposed in the housing, each feeding device comprising a horizontal conveyer configured for laterally conveying at least one foodstuff thereon;
a vertically extending shaft disposed in the housing;
a motor-driven transport device located within the vertical shaft, the motor-driven transport device configured to travel up and down in the shaft and configured to be charged with the at least one foodstuff by the at least one feeding device;
a discharging point disposed in or on the housing, the motor-driven transport device conveying the at least one foodstuff in the direction of the discharging point, the motor-driven transport device having at least one platform which travels in a vertical direction in the shaft, each platform pivotable about a horizontal pivot axle and configured to be charged with the at least one foodstuff, the horizontal conveyor configured to convey a given foodstuff therefrom and onto a corresponding platform, wherein the at least one platform is pivotable via a stepper motor; and
an oven connected to the foodstuff conveying and delivery apparatus, the foodstuff conveying and delivery apparatus positioned downstream of the oven, the oven configured to bake the foodstuff prior to delivery thereof to the foodstuff conveying and delivery apparatus.

20. The system as recited in claim 19, wherein the at least one feeding device includes a first feeding device and at least one additional feeding device, and wherein the at least one platform is arranged between the first feeding device and the at least one additional feeding device, and the at least one platform is loadable by both the first feeding device and the at least one additional feeding device.

* * * * *